US012798440B2

(12) United States Patent
Jeong et al.

(10) Patent No.: US 12,798,440 B2
(45) Date of Patent: Nov. 17, 2026

(54) FUEL CELL VEHICLE AND METHOD OF CONTROLLING THE SAME

(71) Applicants: Hyundai Motor Company, Seoul (KR); Kia Corporation, Seoul (KR)

(72) Inventors: Seong Cheol Jeong, Suwon-si (KR); Joo Yeon Kim, Seoul (KR); Mi Ji Kim, Gwacheon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 834 days.

(21) Appl. No.: 18/195,491

(22) Filed: May 10, 2023

(65) Prior Publication Data

US 2024/0174133 A1 May 30, 2024

(30) Foreign Application Priority Data

Nov. 28, 2022 (KR) ........................ 10-2022-0161680

(51) Int. Cl.
*B60L 58/31* (2019.01)
*B60L 58/12* (2019.01)

(52) U.S. Cl.
CPC ............... *B60L 58/31* (2019.02); *B60L 58/12* (2019.02); *B60L 2210/10* (2013.01)

(58) Field of Classification Search
CPC ....... B60L 58/31; B60L 58/12; B60L 2210/10
USPC ........................................................ 320/101
See application file for complete search history.

(56) References Cited

U.S. PATENT DOCUMENTS 8,404,392 B2 * 3/2013 Chowdhury ...... H01M 8/04298 429/432
10,770,740 B2 * 9/2020 Kim ...................... H01M 10/44
2009/0112384 A1 * 4/2009 Jeon ................. H01M 8/04225 701/22

FOREIGN PATENT DOCUMENTS

CN 102379060 * 3/2012

* cited by examiner

*Primary Examiner* — Richard V Muralidar
(74) *Attorney, Agent, or Firm* — Morgan, Lewis & Bockius LLP

(57) ABSTRACT

A fuel cell vehicle includes a fuel cell stack connected to a direct current (DC) link, an energy storage device selectively connected to the DC link through a main relay, and a controller configured to determine whether or not starting of the fuel cell stack is allowed according to a voltage of the energy storage device, and to control starting of the fuel cell stack based on a result of the determination.

20 Claims, 6 Drawing Sheets

FUEL CELL VEHICLE AND METHOD OF CONTROLLING THE SAME

CROSS-REFERENCE TO THE RELATED APPLICATION

This application claims priority from Korean Patent Application No. 10-2022-0161680, filed on Nov. 28, 2022, in the Korean Intellectual Property Office, the disclosure of which is incorporated herein by reference in its entirety.

TECHNICAL FIELD

The present disclosure relates to a fuel cell vehicle for controlling starting of a fuel cell stack and a method of controlling the same.

BACKGROUND

With the recent increase in interest in the environment, eco-friendly vehicles each equipped with an electric motor as a power source have been increasing in number. An eco-friendly vehicle is also referred to as an electrified vehicle, and representative examples thereof may include a hybrid electric vehicle (HEV), an electric vehicle (EV), and a fuel cell electric vehicle (FCEV).

In general, the fuel cell vehicle may include an energy storage device such as a high-voltage battery and a fuel cell stack as energy sources. In this instance, the fuel cell vehicle may contribute to improving fuel efficiency of the vehicle by storing regenerative braking energy generated during driving in the energy storage device and utilizing the stored energy as necessary.

The fuel cell vehicle may use a supercapacitor instead of the high-voltage battery as the energy storage device. The supercapacitor has advantages of high durability and high instantaneous output power when compared to the high-voltage battery.

In addition, when the fuel cell vehicle uses the high-voltage battery as the energy storage device, a DC/DC converter such as a Bidirectional High DC Converter (BHDC) for controlling power transfer between the high-voltage battery and the fuel cell stack is required. However, when the supercapacitor is used as the energy storage device, a power system may be configured without a separate DC/DC converter.

In the power system without the DC/DC converter, the fuel cell stack and the supercapacitor are directly connected to each other, and thus an operating point of the fuel cell stack may be determined by a voltage of the supercapacitor. Accordingly, in the case of controlling starting of the fuel cell stack when the voltage of the supercapacitor is low, the fuel cell stack may be damaged, and a relay connected to the supercapacitor may be damaged or fused.

The matters described as the background art above are only for improving understanding of the background of the present disclosure, and should not be taken as an admission that the matters correspond to prior art previously known to those skilled in the art.

SUMMARY

Therefore, the present disclosure has been made in view of the above problems, and it is an object of the present disclosure to provide a fuel cell vehicle in which a supercapacitor is used as an energy storage device and a power system is configured without a DC/DC converter for the energy storage device, and a method of controlling the same.

It is another object of the present disclosure to ensure starting stability of a fuel cell stack by determining whether or not the fuel cell stack may be started according to a voltage of a supercapacitor, and then controlling starting of the fuel cell stack.

Technical problems to be solved in the present disclosure are not limited to the technical problems mentioned above, and other technical problems not mentioned herein will be clearly understood by those skilled in the art from the description below.

In accordance with an aspect of the present disclosure, the above and other objects can be accomplished by the provision of a fuel cell vehicle including a fuel cell stack connected to a direct current (DC) link, an energy storage device selectively connected to the DC link through a main relay, and a controller configured to determine whether or not starting of the fuel cell stack is allowed according to a voltage of the energy storage device, and to control starting of the fuel cell stack based on a result of the determination.

In accordance with another aspect of the present disclosure, there is provided a method of controlling a fuel cell vehicle, the method including determining whether starting of a fuel cell stack connected to a DC link is allowed according to a voltage of an energy storage device selectively connected to the DC link though a main relay, and controlling starting of the fuel cell stack based on a result of the determination.

BRIEF DESCRIPTION OF THE DRAWINGS

The following drawings attached to this specification illustrate a preferred embodiment of the present disclosure, and serve to help further understanding of the technical idea of the present disclosure together with the detailed description of the present disclosure. Thus, the present disclosure should not be construed as being limited only to the matters described in such drawings.

DETAILED DESCRIPTION OF THE PREFERRED EMBODIMENTS

Figure 1:
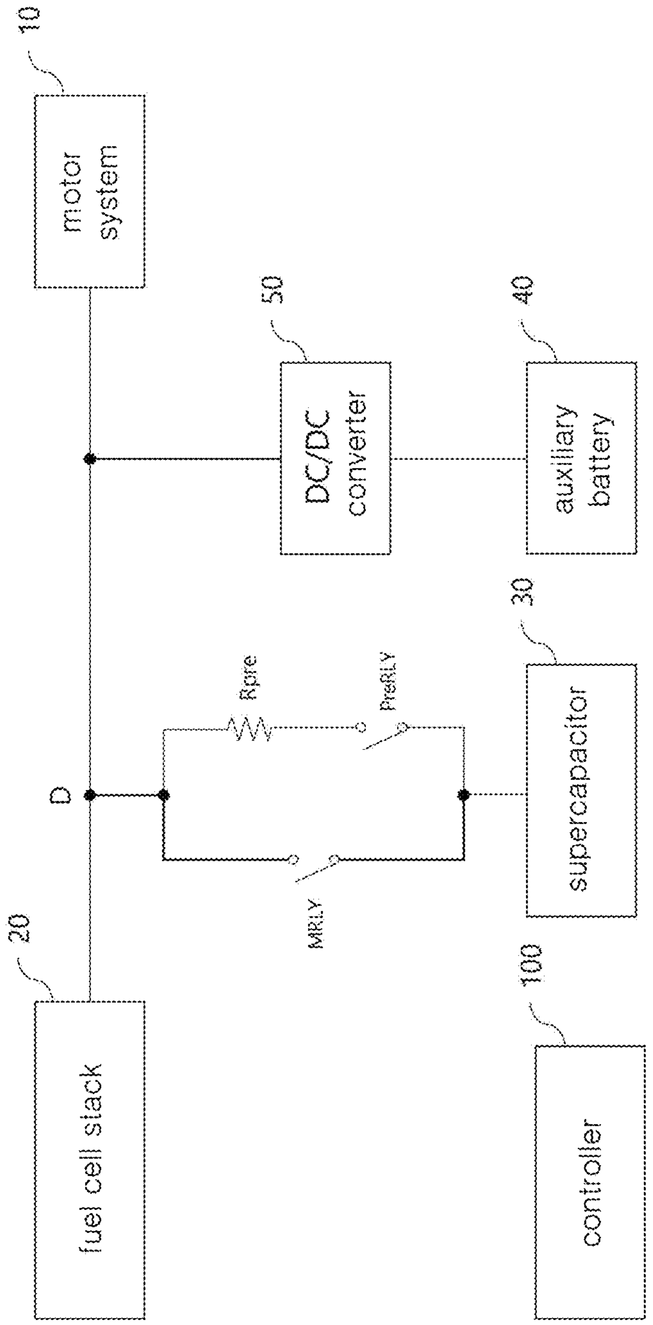
FIG. 1 is a block diagram illustrating a power system configuration of a fuel cell vehicle according to an embodiment of the present disclosure.

Hereinafter, embodiments of the present disclosure will be described in detail with reference to the accompanying drawings, and the same or similar elements will be given the same reference numerals regardless of reference symbols, and redundant description thereof will be omitted.

In describing the embodiments disclosed in the present specification, when it is determined that a detailed description of related publicly known technology may obscure the gist of the embodiments disclosed in the present specification, the detailed description thereof will be omitted. The accompanying drawings are used to help easily describe various technical features and it should be understood that the embodiments presented herein are not limited by the accompanying drawings. As such, the present disclosure should be construed to extend to any alterations, equivalents and substitutes in addition to those which are particularly set out in the accompanying drawings.

In description of the following embodiments, the term “preset” means that a value of a parameter is predetermined when the parameter is used in a process or algorithm. The value of the parameter may be set when a process or algorithm starts or may be set during a period during which a process or algorithm is performed, depending on embodiments.

Although terms including ordinal numbers, such as “first”, “second”, etc., may be used herein to describe various elements, the elements are not limited by these terms. These terms are generally only used to distinguish one element from another.

When an element is referred to as being “coupled” or “connected” to another element, the element may be directly coupled or connected to the other element. However, it should be understood that another element may be present therebetween. In contrast, when an element is referred to as being “directly coupled” or “directly connected” to another element, it should be understood that there are no other elements therebetween.

A singular expression includes the plural form unless the context clearly dictates otherwise.

In the present specification, it should be understood that a term such as “include” or “have” is intended to designate that the features, numbers, steps, operations, elements, parts, or combinations thereof described in the specification are present, and does not preclude the possibility of addition or presence of one or more other features, numbers, steps, operations, elements, parts, or combinations thereof.

In addition, a unit or control unit included in names such as a fuel cell control unit (FCU) and a motor control unit (MCU) is a term widely used for naming controllers for controlling a vehicle-specific function, and does not mean a generic functional unit. For example, each controller may include a communication device that communicates with another controller or a sensor to control a function assigned thereto, a memory that stores an operating system, a logic command, input/output information, etc., and one or more processors that perform determination, calculation, decision, etc. necessary for controlling a function assigned thereto.

FIG. 1 is a block diagram illustrating a power system configuration of a fuel cell vehicle according to an embodiment of the present disclosure.

As illustrated in FIG. 1, the power system of the fuel cell vehicle may include a motor system 10, a fuel cell stack 20, an energy storage device 30, an auxiliary battery 40, a DC/DC converter 50, a controller 100, a main relay MRLY, a precharge relay PreRLY, and a precharge resistor Rpre.

The motor system 10 may include a motor having a plurality of coils corresponding to a plurality of phases, respectively, and an inverter for driving the motor based on a voltage of a DC link D.

The fuel cell stack 20 is connected to the DC link D, and may have a structure in which a plurality of fuel cells is stacked.

The energy storage device 30 may be implemented as an electrochemical capacitor, a so-called supercapacitor. Accordingly, the energy storage device 30 (hereinafter referred to as a supercapacitor) may be selectively connected to the DC link D through the main relay MRLY without a separate DC/DC converter.

The main relay MRLY may be connected between the DC link D and the supercapacitor 30. The precharge relay PreRLY and the precharge resistor Rpre may be connected in parallel with the main relay MRLY between the DC link D and the supercapacitor 30, and may be connected in series with each other.

The auxiliary battery 40 may be connected to the DC link D through the DC/DC converter 50.

The DC/DC converter 50 is connected between the DC link D and the auxiliary battery 40, and may boost a voltage of the auxiliary battery 40 and output the voltage to the DC link D, or may step down a voltage of the DC link D and charge the auxiliary battery 40.

The controller 100 may control starting of the fuel cell stack 20, control supply of fuel (hydrogen) and air (oxygen) to the fuel cell stack 20, control a voltage of the supercapacitor 30, and control operation of the DC/DC converter 50. In implementation, the controller 100 may be implemented as a single controller, or may be implemented in a form in which functions are distributed to a plurality of controllers. For example, the controller 100 may be implemented as an FCU or may be implemented as a combination of the FCU and a subordinate controller thereof. However, the present disclosure is not limited thereto.

According to an exemplary embodiment of the present disclosure, the controller 100 may include a processor (e.g., computer, microprocessor, CPU, ASIC, circuitry, logic circuits, etc.) and an associated non-transitory memory storing software instructions which, when executed by the processor, provides the functionalities of the controller 100. Herein, the memory and the processor may be implemented as separate semiconductor circuits. Alternatively, the memory and the processor may be implemented as a single integrated semiconductor circuit. The processor may embody one or more processor (s).

As described above, the power system of the fuel cell vehicle according to the present embodiment uses the supercapacitor 30, which has higher durability and instantaneous output power than those of the high-voltage battery, as an energy storage device, and eliminates a separate DC/DC converter for the supercapacitor 30, so that it is possible to reduce elements and the area consumed in the power system.

Meanwhile, when the fuel cell stack 20 and the supercapacitor 30 are directly connected at the DC link D to start the fuel cell stack 20, the operating point of the fuel cell stack 20 may be determined by the voltage of the supercapacitor 30.

Accordingly, when the fuel cell stack 20 is started in a state in which the voltage of the supercapacitor 30 is low, the fuel cell stack 20 may output high power in a state in which the fuel cell stack 20 is not fully activated. As a result, the fuel cell stack 20 is damaged due to the insufficient amount of fuel and air supplied to the fuel cell stack 20, and when the main relay MRLY is turned on, the main relay MRLY may be damaged and fused due to an instantaneous high current.

Therefore, the present embodiment proposes that starting of the fuel cell stack 20 be controlled after determining whether or not the fuel cell stack may be started according to the voltage of the supercapacitor 30, thereby ensuring starting stability of the fuel cell stack 20. An operation method therefor is illustrated in FIG. 2.

Figure 2:
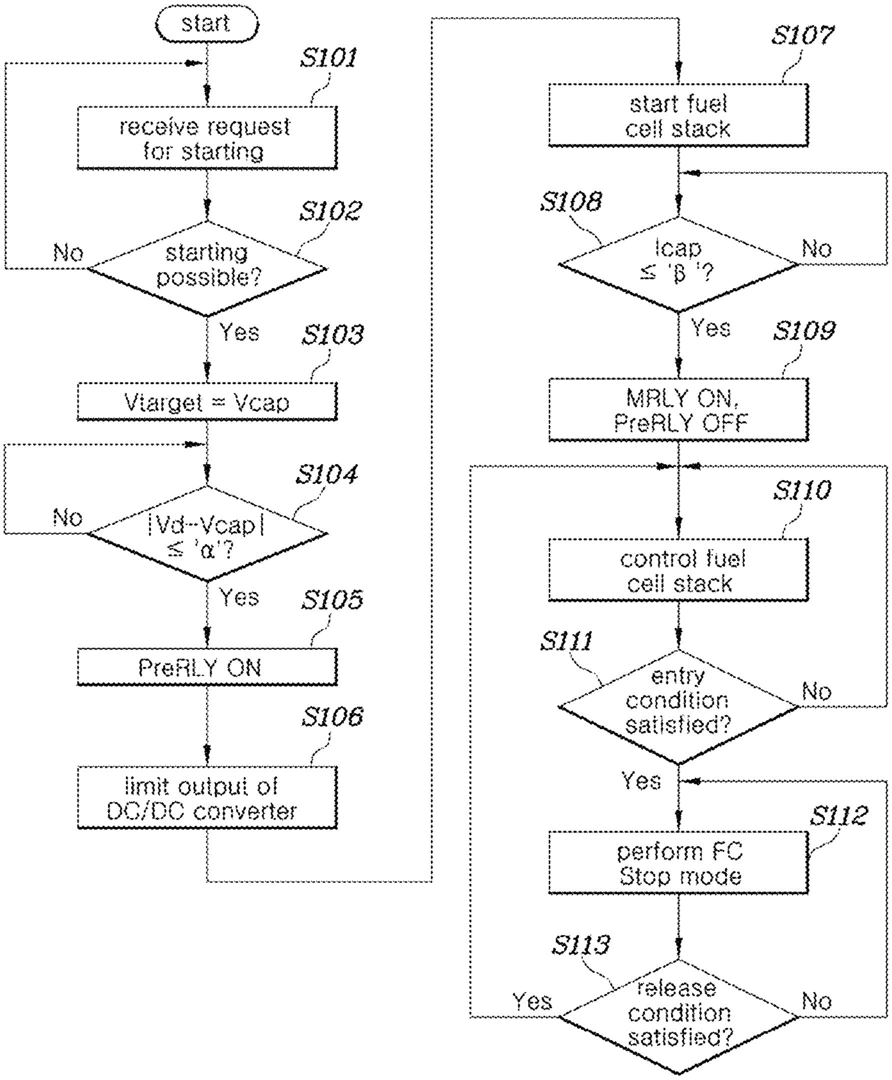
FIG. 2 is a flowchart for describing a method of controlling the fuel cell vehicle according to an embodiment of the present disclosure.

FIG. 2 is a flowchart for describing a method of controlling the fuel cell vehicle according to an embodiment of the present disclosure.

Referring to FIG. 2, the controller 100 may receive a request for starting the fuel cell stack 20 (S101).

Upon receiving the request for starting the fuel cell stack 20, the controller 100 may determine whether or not the fuel cell stack 20 may be started according to the voltage of the supercapacitor 30 (S102), and control starting of the fuel cell stack 20 based on a determination result (S103 to S107).

More specifically, the controller 100 may determine whether or not the fuel cell stack 20 may be started according to a level difference between an open circuit voltage OCV of the fuel cell stack 20 and the voltage of the supercapacitor 30 (S102).

Figure 3:
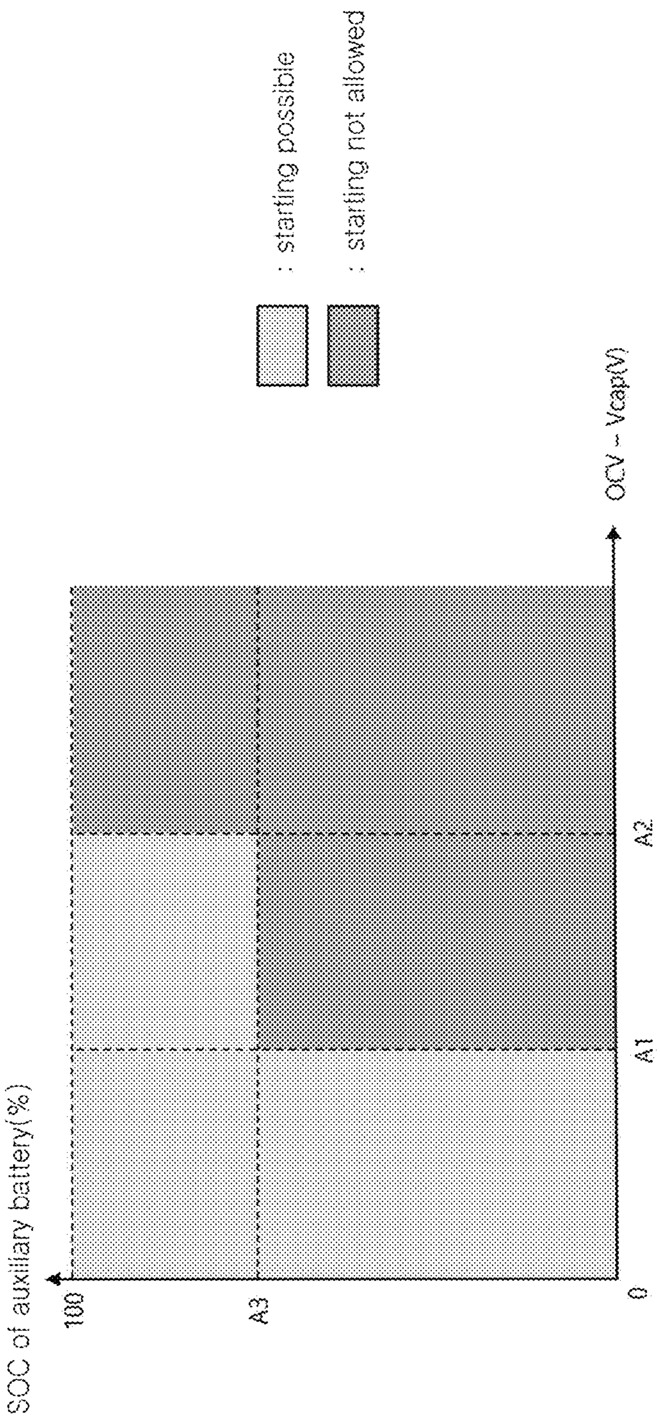
FIG. 3 is a diagram for describing a process of determining whether the fuel cell stack may be started by a controller according to an embodiment of the present disclosure.

Referring to FIG. 3, a process of determining whether or not the fuel cell stack may be started is illustrated. When the level difference between the open circuit voltage OCV of the fuel cell stack 20 and the voltage Vcap of the supercapacitor 30 is equal to or less than a preset first level A1, the controller 100 may determine that the fuel cell stack 20 may be started. That is, when the level difference between the open circuit voltage OCV and the voltage Vcap exceeds the preset first level A1, the controller 100 may determine that it is difficult to ensure starting stability of the fuel cell stack 20 since the level of the voltage Vcap is less than the open circuit voltage OCV. In addition, in order to expand a region in which the fuel cell stack 20 may be started, the controller 100 may determine that the fuel cell stack 20 may be started when the level difference between the open circuit voltage OCV and the voltage Vcap is less than or equal to a preset second level A2 set to be greater than the preset first level A1, and a value of a state of charge (SOC) of the auxiliary battery 40 is greater than or equal to a preset value A3. A reason therefor is that, when the SOC value of the auxiliary battery 40 is greater than or equal to the preset value A3, the supercapacitor 30 may be charged through the auxiliary battery 40 to increase the voltage Vcap.

Referring back to FIG. 2, upon determining that the fuel cell stack 20 may be started (YES in S102), the controller 100 may set the target voltage Vtarget of the DC link D to the voltage Vcap of the supercapacitor, and perform a control operation so that the voltage of the DC link D follows the target voltage Vtarget through the DC/DC converter 50 based on the voltage of the auxiliary battery 40 (S103).

Thereafter, the controller 100 may determine whether or not a level difference between the voltage Vd of the DC link D and the voltage Vcap of the supercapacitor 30 is less than or equal to a preset allowable level α in order to determine a turn-on time of the precharge relay PreRLY (S104). Depending on the embodiment, the controller 100 may determine the turn-on time of the precharge relay PreRLY based on a current of the DC link D in order to prevent instantaneous overcurrent when the precharge relay PreRLY is turned on.

When the level difference between the voltage Vd and the voltage Vcap is equal to or less than the preset allowable level α (YES in S104), the controller 100 may turn on the precharge relay PreRLY to start the fuel cell stack 20 (S105).

When the precharge relay PreRLY is turned on, the controller 100 may limit output power of the DC/DC converter 50 within a set range according to the SOC value of the auxiliary battery 40 in order to manage the SOC of the auxiliary battery 40 (S106). Accordingly, the controller 100 may prevent discharging of the auxiliary battery 40 for charging the supercapacitor 30 when the SOC value of the auxiliary battery 40 is low, and prevent overcharging of the auxiliary battery 40 to of due discharging the supercapacitor 30 when the SOC value of the auxiliary battery 40 is high. Meanwhile, the output power of the DC/DC converter 50 may be limited to 0 (kW) in order to cut off power of the auxiliary battery 40 while the fuel cell stack 20 is activated.

Then, the controller 100 may start the fuel cell stack 20 (S107).

When starting of the fuel cell stack 20 is completed, the operating point of the fuel cell stack 20 is determined by a voltage of the supercapacitor 30. Thus, for stable main relay MRLY operation, the controller 100 may determine whether or not a value of a current Icap of the supercapacitor 30 is equal to or less than a preset current value β in a state in which the precharge relay PreRLY is turned on (S108). Depending on the embodiment, the current Icap value may be measured by a separate current sensor for the supercapacitor 30 or estimated based on an output current of the fuel cell stack 20 and an output current of the DC/DC converter 50.

When the value of the current Icap is equal to or less than the preset current value β (YES in S107), the controller 100 may turn off the precharge relay PreRLY and turn on the main relay MRLY (S109). Accordingly, the fuel cell stack 20 and the supercapacitor 30 may be directly connected through the main relay MRLY.

Figure 4:
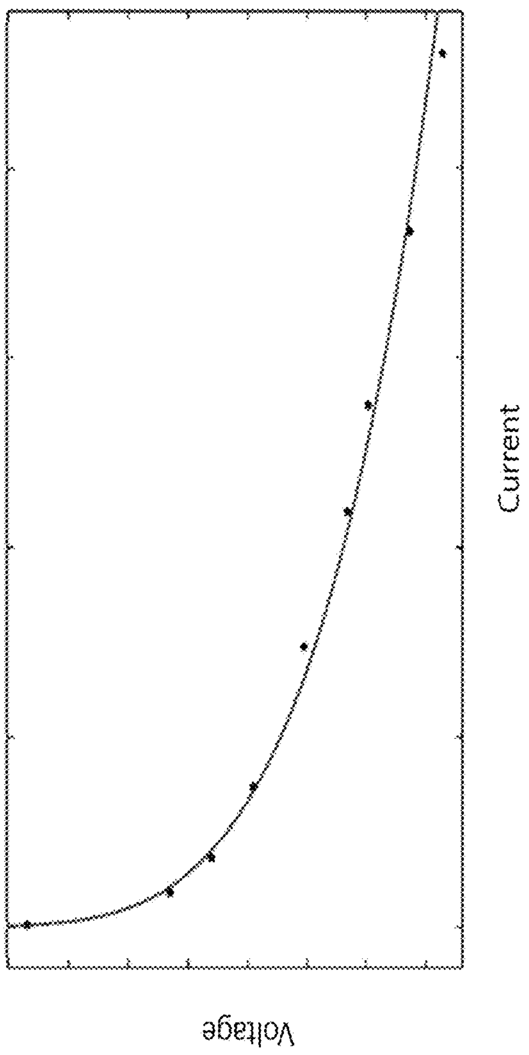
FIG. 4 is a diagram illustrating an example of an I-V characteristic curve of the fuel cell stack according to an embodiment of the present disclosure.

Subsequently, in order to prevent a shortage of the amount of fuel (hydrogen) and the amount of air (oxygen) supplied to the fuel cell stack 20, the controller 100 may control the amount of fuel (hydrogen) and the amount of air (oxygen) supplied to the fuel cell stack 20 based on a higher one of required output power of the fuel cell stack 20 and actual output power of the fuel cell stack 20 in a state in which the main relay MRLY is turned on (S110). More specifically, the required output power may correspond to output power corresponding to a voltage of the supercapacitor 30 in the I-V characteristic curve of the fuel cell stack, and the actual output power may correspond to output power corresponding to an actual current of the fuel cell stack 20 for load following. The I-V characteristic curve of the fuel cell stack 20 may vary according to a degree of deterioration of the fuel cell stack 20. Referring to FIG. 4, an example of the I-V characteristic curve of the fuel cell stack 20 is illustrated.

Figure 5:
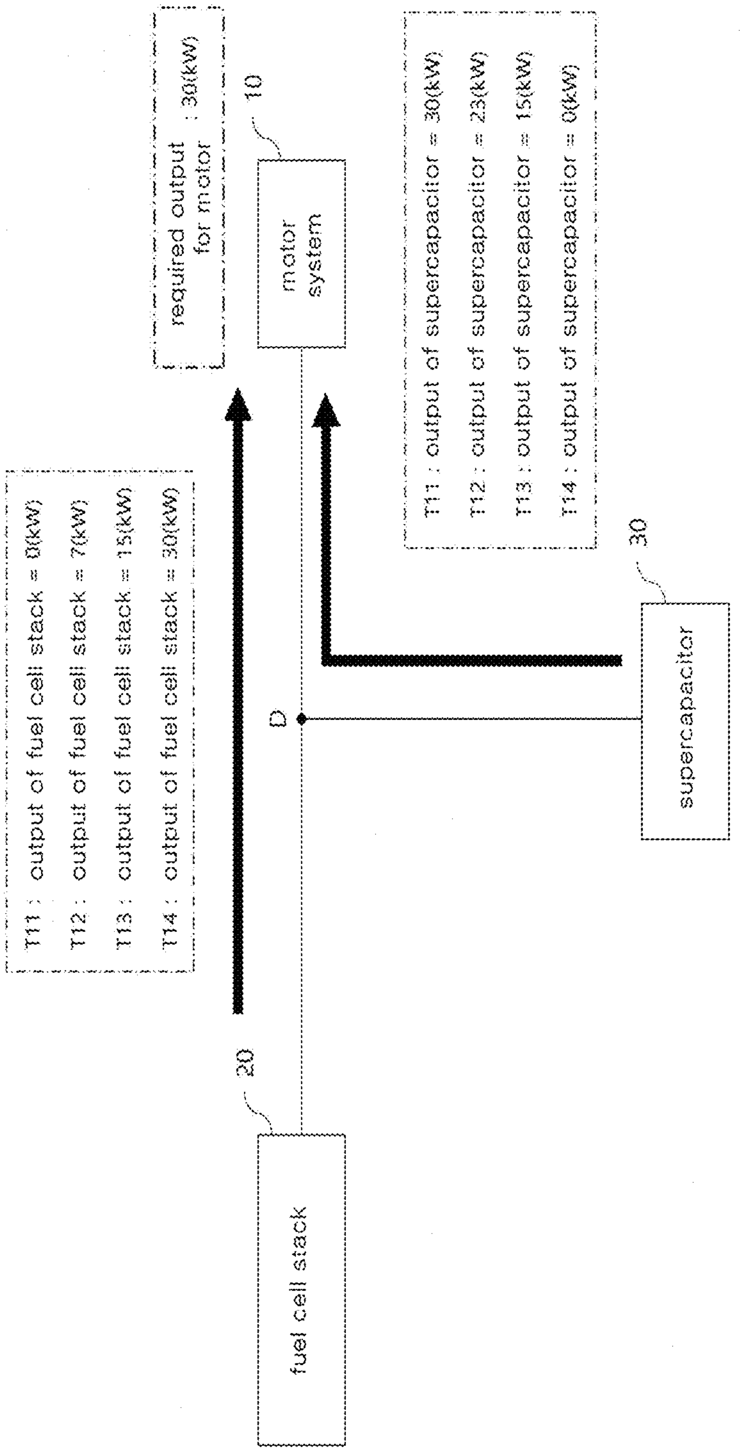
FIG. 5 is a diagram for describing a process of controlling an output of the fuel cell stack by the controller according to an embodiment of the present disclosure.

Referring to FIG. 5, a process of controlling output of the fuel cell stack is illustrated. It is possible to confirm that, when required output for the motor of the motor system 10 corresponds to 30 (KW), output power of the supercapacitor 30 decreases from 30 (kW) to 23 (kW), 15 (KW), and 0 (KW) with the passage of time T11, T12, T13, and T14, and output power of the fuel cell stack 20 increases from 0 (kW) to 7 (kW), 15 (kW), and 30 (kW) with the passage of time T11, T12, T13, and T14.

Referring back to FIG. 2, the controller 100 may determine whether or not an entry condition for a power generation stop mode (FC Stop Mode) of the fuel cell stack 20 is satisfied (S111). In the present embodiment, the power generation stop mode (FC Stop Mode) may be performed to prevent overcharging of the supercapacitor 30 due to discharging of the fuel cell stack 20. The entry condition for the power generation stop mode (FC Stop Mode) may be satisfied when the SOC value of the supercapacitor 30 exceeds a preset first threshold value, or a voltage level of the DC link D exceeds a preset first threshold level. In this instance, the preset first threshold level may be set lower than a lower one of a maximum allowable voltage level of the fuel cell stack 20 and a maximum allowable voltage level of the supercapacitor 30.

Figure 6:
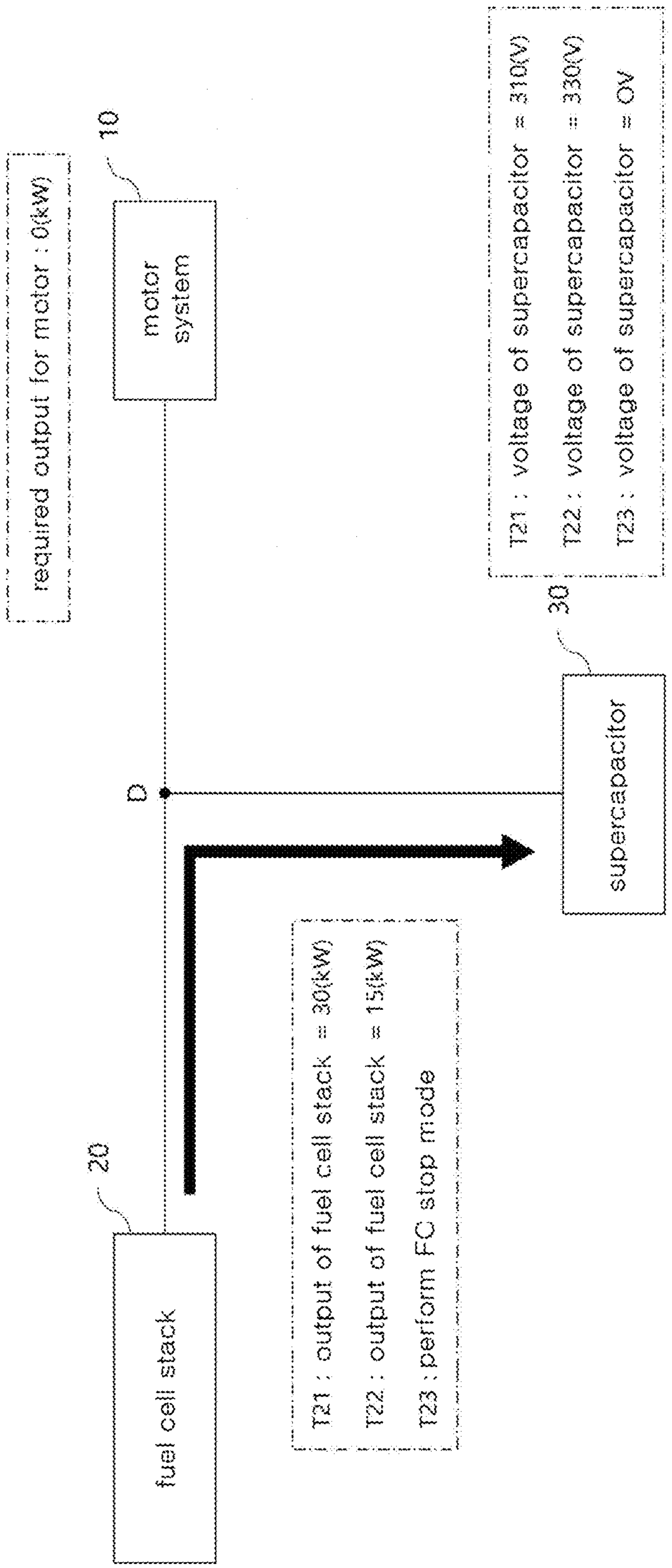
FIG. 6 is a diagram for describing a process of preventing overcharging of a supercapacitor by the controller according to an embodiment of the present disclosure.

Referring to FIG. 6, a process of preventing overcharging of the supercapacitor is illustrated. When required output for the motor of the motor system 10 corresponds to 0 (KW) in a state in which starting of the fuel cell stack 20 is completed (that is, in a state in which the fuel cell vehicle is stopped), output power of the fuel cell stack 20 is transferred to the supercapacitor 30, and thus the voltage and the SOC value of the supercapacitor 30 may continuously increase. For example, since the supercapacitor 30 continuously receives power from the fuel cell stack 20 at times T21 and T22, the voltage of the supercapacitor 30 may increase at time T22 rather than at time T21. When the voltage level of the supercapacitor 30 (that is, the voltage level of the DC link D) exceeds a preset first threshold level (OV) at time T23, the controller 100 may determine that an entry condition for the power generation stop mode (FC Stop Mode) is satisfied.

Referring back to FIG. 2, when the entry condition for the power generation stop mode (FC Stop Mode) is satisfied (YES in S111), the controller 100 may perform the power generation stop mode (FC Stop Mode) for the fuel cell stack 20 (S112).

Thereafter, the controller 100 may determine whether or not a release condition for the power generation stop mode (FC Stop Mode) is satisfied in a state in which the power generation stop mode (FC Stop Mode) is performed (S113). In the present embodiment, the release condition for the power generation stop mode (FC Stop Mode) may be satisfied when the SOC value of the supercapacitor 30 is less than a preset second threshold value, or the voltage level of the DC link D is less than a preset second threshold level. In this instance, in order to prevent frequent entry and release of the power generation stop mode (FC Stop Mode), the second threshold value may be set lower than the first threshold value, and the second threshold level may be set lower than the first threshold level. In addition, the release condition for the power generation stop mode (FC Stop Mode) may be satisfied when the required output (or the amount of change of the required output) for the motor of the motor system 10 is greater than preset required output (or the amount of change of the required output). A reason therefor is that a phenomenon in which the amount of fuel (hydrogen) and the amount of air (oxygen) supplied to the fuel cell stack 20 becomes insufficient occurs when the power generation stop mode (FC Stop Mode) is released after the voltage of the supercapacitor 30 rapidly drops due to the required output for the motor in the power generation stop mode (FC Stop Mode).

According to the present disclosure, by using the supercapacitor as the energy storage device and constructing the power system without the DC/DC converter for the energy storage device, it is possible to improve durability and instantaneous output of the energy storage device, and reduce elements and the area consumed in a power system.

In addition, according to the present disclosure, starting stability of the fuel cell stack may be ensured by determining whether or not the fuel cell stack may be started according to the voltage of the supercapacitor and then controlling starting of the fuel cell stack.

The effects obtainable in the present disclosure are not limited to the above-mentioned effects, and other effects not mentioned herein may be clearly understood by those of ordinary skill in the art to which the present disclosure belongs from the above description.

Meanwhile, the present disclosure described above may be implemented as computer-readable code on a medium in which a program is recorded. The computer-readable medium includes all types of recording devices in which data readable by a computer system is stored. Examples of the computer-readable medium include a hard disk drive (HDD), a solid-state drive (SSD), a silicon disk drive (SDD), a ROM, a RAM, a CD-ROM, a magnetic tape, a floppy disk, an optical data storage device, etc. Therefore, the above detailed description should not be construed as restrictive and should be considered as illustrative in all respects. The scope of the present disclosure should be determined by a reasonable interpretation of the appended claims, and all modifications within the equivalent scope of the present disclosure are included in the scope of the present disclosure.

What is claimed is:

1. A fuel cell vehicle comprising:

a fuel cell stack connected to a direct current (DC) link;

an energy storage device selectively connected to the DC link through a main relay; and a controller configured to determine whether or not starting of the fuel cell stack is allowed according to a voltage of the energy storage device, and to control starting of the fuel cell stack based on a result of the determination, wherein the controller determines whether or not starting of the fuel cell stack is allowed based on a level difference between an open circuit voltage of the fuel cell stack and a voltage of the energy storage device.

2. The fuel cell vehicle according to claim 1, wherein the energy storage device is implemented as an electrochemical capacitor.

3. The fuel cell vehicle according to claim 1, wherein, when the level difference between the open circuit voltage of the fuel cell stack and the voltage of the energy storage device is equal to or less than a preset first level, the controller determines that starting of the fuel cell stack is allowed.

4. The fuel cell vehicle according to claim 3, further comprising: a battery connected to the DC link through a DC/DC converter, wherein: when the level difference between the open circuit voltage and the voltage of the energy storage device is less than or equal to a preset second level, and a value of a state of charge (SOC) of the battery is greater than or equal to a preset value, the controller determines that starting of the fuel cell stack is allowed; and the preset second level is set greater than the preset first level.

5. The fuel cell vehicle according to claim 1, further comprising: a DC/DC converter connected between the DC link and a battery, wherein, in response to a determination that starting of the fuel cell stack is allowed, the controller sets a target voltage of the DC link to the voltage of the energy storage device, and performs a control operation so that a voltage of the DC link follows the target voltage through the DC/DC converter.

6. The fuel cell vehicle according to claim 5, further comprising: a precharge relay and a precharge resistor connected in parallel with the main relay and connected in series with each other, wherein, when a level difference between a voltage of the DC link and a voltage of the energy storage device is less than or equal to a preset allowable level, the controller turns on the precharge relay to start the fuel cell stack.

7. The fuel cell vehicle according to claim 6, wherein, when the precharge relay is turned on, the controller limits output power of the DC/DC converter based on an SOC value of the battery.

8. The fuel cell vehicle according to claim 6, wherein, when a current value of the energy storage device is less than or equal to a preset current value in a state in which the precharge relay is turned on, the controller turns off the precharge relay and turns on the main relay.

9. The fuel cell vehicle according to claim 1, wherein the controller controls an amount of fuel and an amount of air supplied to the fuel cell stack based on a higher one of required output power of the fuel cell stack and actual output power of the fuel cell stack in a state in which the main relay is turned on.

10. The fuel cell vehicle according to claim 1, wherein, when a state of charge (SOC) value of the energy storage device exceeds a preset first threshold value, or a voltage level of the DC link exceeds a preset first threshold level in a state in which the main relay is turned on, the controller enters a power generation stop mode of the fuel cell stack.

11. The fuel cell vehicle according to claim 10, wherein:
the controller releases the power generation stop mode when the SOC value of the energy storage device is less than a second threshold value, or the voltage level of the DC link is less than a preset second threshold level in a state in which the power generation stop mode is performed;
the second threshold value is set less than the first threshold value; and
the first threshold level is set less than the second threshold level.

12. A method of controlling a fuel cell vehicle, the method comprising:
determining whether starting of a fuel cell stack connected to a DC link is allowed according to a voltage of an energy storage device selectively connected to the DC link through a main relay; and
controlling starting of the fuel cell stack based on a result of the determination, wherein the determining comprises determining whether or not starting of the fuel cell stack is allowed based on a level difference between an open circuit voltage of the fuel cell stack and a voltage of the energy storage device.

13. The method according to claim 12, wherein the determining comprises:
determining that starting of the fuel cell stack is allowed when the level difference between the open circuit voltage of the fuel cell stack and the voltage of the energy storage device is equal to or less than a preset first level.

14. The method according to claim 13, wherein the determining further comprises:
determining that starting of the fuel cell stack is allowed when the level difference between the open circuit voltage and the voltage of the energy storage device is less than or equal to a preset second level, and a value of a state of charge (SOC) of an auxiliary battery connected to the DC link through a DC/DC converter is greater than or equal to a preset value, wherein the preset second level is set higher than the preset first level.

15. The method according to claim 12, wherein the controlling comprises:
in response to a determination that starting of the fuel cell stack is allowed, setting a target voltage of the DC link to the voltage of the energy storage device; and
performing a control operation so that a voltage of the DC link follows the target voltage through a DC/DC converter connected between the DC link and a battery.

16. The method according to claim 15, wherein the controlling comprises: turning on a precharge relay connected in parallel with the main relay to start the fuel cell stack when a level difference between a voltage of the DC link and a voltage of the energy storage device is less than or equal to a preset allowable level.

17. The method according to claim 16, further comprising:
turning off the precharge relay and turning on the main relay when a current value of the energy storage device is less than or equal to a preset current value in a state in which the precharge relay is turned on.

18. The method according to claim 12, further comprising:
controlling an amount of fuel and an amount of air supplied to the fuel cell stack based on a higher one of required output power of the fuel cell stack and actual output power of the fuel cell stack in a state in which the main relay is turned on.

19. The method according to claim 12, further comprising:
entering a power generation stop mode of the fuel cell stack when a state of charge (SOC) value of the energy storage device exceeds a preset first threshold value, or a voltage level of the DC link exceeds a preset first threshold level in a state in which the main relay is turned on.

20. The method according to claim 19, wherein:
the power generation stop mode is released when the SOC value of the energy storage device is less than a second threshold value, or the voltage level of the DC link is less than a preset second threshold level in a state in which the power generation stop mode is performed;
the second threshold value is set less than the first threshold value; and
the first threshold level is set less than the second threshold level.

* * * * *